Feb. 4, 1964     A. R. OZANICH     3,120,100
ROCKET MOTOR
Filed Nov. 17, 1961     2 Sheets-Sheet 1
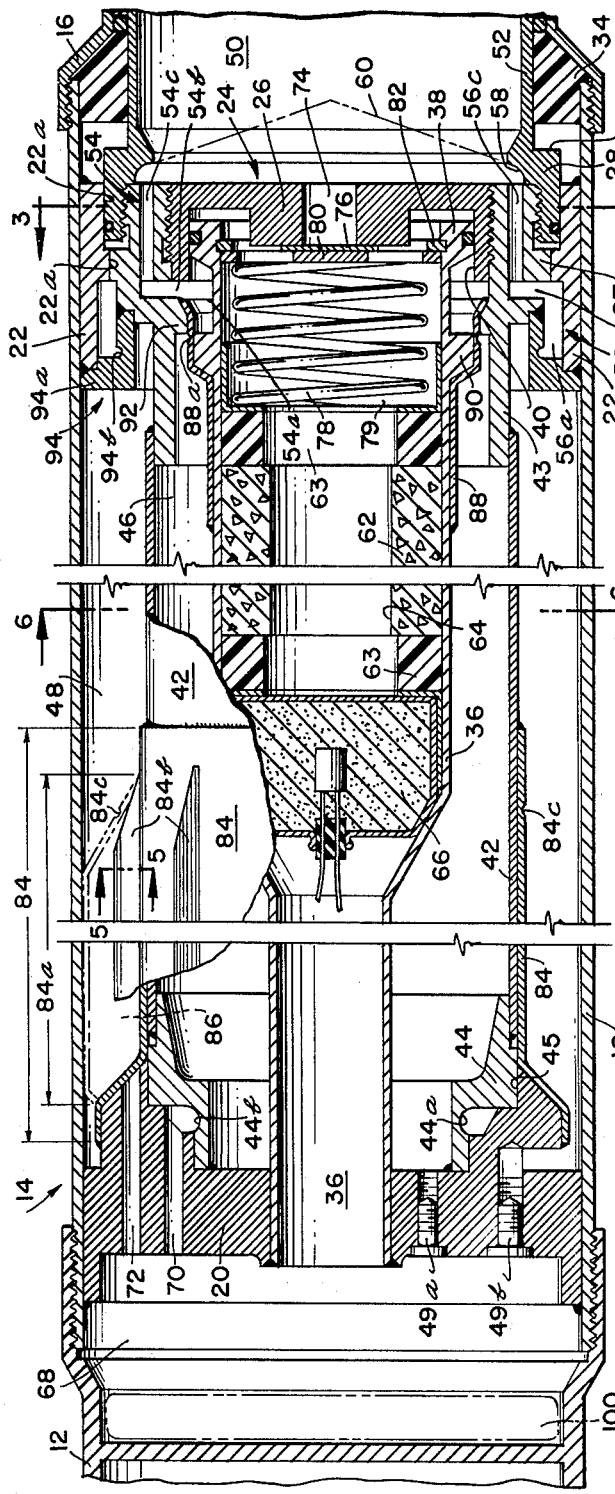
INVENTOR.
ANTHONY R. OZANICH
BY
V.C. Muller
ATTORNEY.

3,120,100
ROCKET MOTOR
Anthony R. Ozanich, Cupertino, Calif., assignor to the United States of America as represented by the Secretary of the Navy
Filed Nov. 17, 1961, Ser. No. 153,793
7 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to liquid propellant type rocket motors and more particularly to valve systems for controlling the flow of propellants into the combustion chamber of the rocket motor. Certain features of the invention also relate to propellant tankage, generally, and methods of filling such tankage.

For purposes of this specification a liquid propellant type rocket is hereby defined as a thrust-producing system which derives its thrust from the propulsion gases generated by the combustion of two so-called "liquid propellants," one being the "fuel" proper and the other being the "oxidant" for supplying the oxygen necessary for combustion of the fuel; "thrust" as the resultant force produced by the ejection of the gases; and "push button delay" is the elapsed time between the selected instant the rocket motor is electrically initiated, usually the closing of a circuit to fire an actuating squib, and the instant full thrust output is reached.

In certain usages, rocket motors must provide high initial energy and very short push button delays, sometimes called "hard starts." An example of such usage is a propulsion motor for aircraft-launched rocket weapons, where the starting characteristics of a motor have a critical influence on the weapon trajectory. Providing a liquid propellant valving system which is capable of producing such "hard starts" has been a serious problem, prior to the present invention. Prior attempts to solve the problem have proposed valving by use of simple burst or rupturable diaphragms located in the tankage walls and adapted to rupture under rising feed pressure, but it was found that such system would work only if the diaphragms failed at relatively low pressures, resulting in insufficient initial feed pressure. Another prior art approach was to form the propellant release ports by relative movement of a cutting mechanism and the tankage wall, but the kinematic requirement of accelerating the mechanical parts resulted in unacceptably large push button delays. Lacking an adequate valve system, it has heretofore been considered necessary to employ solid propellant type rocket motors to obtain "hard starts," with consequent disadvantage of the lower thrust potential per pound of propellant and the slower rate of energy release associated with solid propellant rockets.

Solution of the problem has been made more difficult because there is often a further requirement that the thrust system function satisfactorily in all positions and attitudes relative to the direction of gravitational attraction, or under conditions of negative acceleration, at the time of launching. The tankage outlets, which form the inlet ends of the feed lines, are usually located at the rear end of the tankage, and the propellant tanks usually contain so-called "ullage gases" which vary in volume to compensate for changes in propellant volume under temperature variations. Adverse acceleration or gravity forces could displace the liquid propellant to the forward end of the tank and the ullage gases to the rear end causing the gases, rather than liquid propellant, to be fed to the combustion chamber, which could result in erratic starts or even destructive and hazardous explosions. The problem is further aggravated because in many instances, especially in designs of small rocket engines, the liquid propellant is pressurized by introduction of a pressurizing gaseous medium directly into the interior of the propellant chamber through gas inlet openings at the front end of the tankage. In such instances, adverse acceleration or gravity forces could cause the pressurizing gases, which are lighter than the liquid, to be streamed or "bubble up" through the length of the tankage into the feed lines, causing erratic feeding. Also, severe deceleration could displace the propellant forwardly into the gas inlet openings and thence into the gas producing system where a destructive or hazardous explosion could occur.

In connection with the ullage gases contained in tankage, it is to be noted that compressing or "pumping up" the ullage gases in the course of placing propellant under feed pressure is one of elements of the "push button delay," and it has been observed that variation in volume of ullage gases due to ambient temperature can cause appreciable variations in the "push button delay."

In addition to the aforementioned difficulties, the use of a valving system employing rupturable elements generally imposes the somewhat contradictory structural requirements of (1) providing for reliable rupturing under normal tankage pressurization, and (2) providing sufficient strength to prevent rupturing under hydrostatic loads due to the inertia of the propellant such as would be experienced if the tankage were accidently dropped, which hydrostatic loads may exceed the normal tankage pressurization.

A further problem, which is generally inherent to any liquid propellant tankage, is that certain oxidants such as red fuming nitric acid will decompose with the evolution of highly corrosive gases that have low solubility in the liquid acid, unless maintained above a given pressure and without contact with any gaseous medium. The corrosive gases which may evolve have a destructive effect on tankage walls, and build up undesirable over-pressures.

Accordingly, it is an object of this invention to provide an improved valving system capable of positively controlling flow of liquid propellant into a combustion chamber of a rocket motor to prove "hard starts."

Another object is to provide a valving system in accordance with the preceding objective which assures safe operation under conditions of negative acceleration and adverse gravity force.

Another object is to provide an improved valving system of the aforesaid type having a substantially constant push button delay over a wide range of temperatures.

Another object is to provide propellant tankage which is capable of containing unstable oxidants over prolonged periods of time, without adverse oxidant decomposition.

A still further object is to provide a novel method of filling propellant tankage.

A still further object is to provide an improved valving system of the type employing rupturable elements which is capable of (1) reliable valving under normal tankage pressurization; and (2) providing structural strength against unauthorized over-pressurization.

Other objects, features, and many of the attendant advantages of this invention will be readily appreciated as the same become better understood by reference to the following detailed description when considered in connection with the accompanying drawings wherein:

FIG. 1 is a side elevation of a rocket;

FIG. 2 is an enlarged fragmentary detailed longitudinal section of the mid-section of the rocket of FIG. 1, containing propellant tankage including a valve system, constructed in accordance with the concepts of the present invention, and taken generally along lines 2—2, FIG. 3;

FIG. 3 is a reduced section taken along lines 3—3, FIG. 2;

FIG. 4 is a detail of the mechanism of FIG. 2;

FIG. 5 is an enlarged detail taken along lines 5—5 of FIG. 2;

FIG. 6 is a reduced section taken along lines 6—6 of FIG. 2; and

Figure 7A:
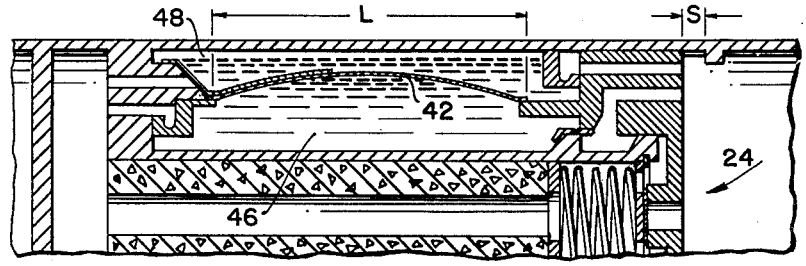
FIGS. 7A through 7D are fragmentary longitudinal sections of a portion of FIG. 2, which somewhat diagrammatically show sequential positions of various parts during operation of the device of the present invention.

Referring now to the drawings and in particular to FIG. 1 thereof, a rocket 10 of the liquid propellant type has a nose section 12, which may contain a payload, a midsection 14 containing the liquid propellant supply and associated feed apparatus for introducing propellants into a combustion chamber, and a tail section 16 containing the combustion chamber. Forward thrust is provided by propulsive gases, produced in the combustion chamber, which are expelled from a nozzle (not shown) at the rear end of the rocket.

Referring now to FIG. 2, mid-section 14 comprises a tube or outer casing 18, which constitutes the outer wall of the rocket and which is threaded at its front and rear ends for detachable connection to corresponding threaded outer walls of the nose and tail sections 12 and 16. Disposed within outer casing 18 at its front end is a front wall or bulkhead 20, which is rigidly secured in place by a welded joint between the wall and the inner surface of the casing. Also disposed within the outer casing 18 at its rear end is a sleeve 22 which is welded to the casing and is provided with internal axially extending sliding surfaces 22a. Mounted within sleeve 22 for rectilinear sliding movement is a movable member or injector-wall 24 which consists of inner, intermediate and outer elements 26, 27 and 28, respectively, threadedly secured together as a rigid assembly. Rearward movement of injector-wall 24 is limited by provision of a shoulder 30 on its rear face adapted to abut against a confronting face of a plastic annular element 34, which is positioned between mid-section 14 and tail section 16 upon their assembly. Longitudinally disposed within casing 18 is an inner tube 36 which is necked-down at its front end and provides a gas generator housing, as will become apparent. The front end of inner tube 36 is rigidly embraced by bulkhead 20, and the rear end is slidingly embraced by injector-wall 24 by means of a collar 38 formed on the outer surface of the tube and an axial surface 40 formed on the injector-wall.

Concentrically disposed between casing 18 and inner tube 36 is a tubular partition 42, which is made of resilient sheet metal and has an elliptical cross section throughout its middle portion (FIG. 6), for reasons hereinafter made clear. The rear end of tubular partition 42 is welded to a forwardly projecting circular flange 43 provided on element 27 of injector-wall 24. Connecting the front end of partition 42 to bulkhead 20 is a rupturable joint consisting of an annular rupturable member 44 which is welded at its front and rear ends to bulkhead 20 and partition 42, respectively. Member 44 is formed with an annular groove 44a for providing a rupturable ring-like weakened portion 44b adjacent an intermediate portion which is adapted to slide on an annular surface 45 formed on bulkhead 20 upon rupture of portion 44b, thus providing a sliding joint between partition 42 and bulkhead 20 under rectilinear movement of the former. Tubular partition 42 divides the space between inner tube 36 and outer casing 18 into an inner annular oxidant storage space or compartment 46 and an outer annular fuel storage space or compartment 48, which may be filled through suitable normally capped inlets 49a, 49b provided in bulkhead 20.

Injector-wall 24 is operatively associated with a thrust or combustion chamber 50 disposed in tail section 16, the injector-wall 24 forming the front bulkhead for the combustion chamber and further providing a rearwardly extending cylindrical heat-resistant liner 52 which extends into the combustion chamber. Adjacent the rear end of oxidant storage compartment 48 is an oxidant outlet conduit 54 for communicating oxidant from compartment 48 to combustion chamber 50. As best understood by concurrent reference to FIGS. 2 and 3, conduit 54 includes an annular zone 54a between element 28 of injector-wall 24 and sleeve 22, a series of angularly spaced radially extending passage elements 54b directed outwardly from chamber 54a, and a corresponding series of longitudinally extending passage elements 54c, each of which extends rearwardly from the inner end of the corresponding radial passage element 54b and opens into chamber 50. A similar fuel outlet conduit 56 is provided adjacent the rear end of fuel storage compartment 46, consisting of an annular zone 56a between inner tube 36 and element 28 of injector-wall 24, equi-angularly spaced passage elements 56b extending radially inwardly therefrom, and longitudinally extending passage element 56c extending rearwardly from the outer ends of passage elements 56b and opening into chamber 50. The longitudinally extending passage elements 54c and 56c form the injector nozzles or ports for introducing oxidant and fuel, respectively, into chamber 50, and their outlet ends open into chamber 50 in a ring-like pattern, FIG. 3, with passage elements 54c and 56c arranged in alternation in the pattern. Associated with the outlet openings of passage elements 54c, 56c is a deflection surface 58, the construction and arrangement being such that the oxidant and fuel emerging from the injection passages are deflected generally along broken lines 60 for intermixing the oxidant and fuel.

Contained within tube 36 is a solid propellant grain 62, held in place by spacer-supports 63. Grain 62 is of the gas generating type and has a central longitudinal bore 64 along which it is adapted to burn, discharging gases from both ends of the bore. Also contained in tube 36 is a conventional electrical igniter 66 for igniting the grain. Directly forward of bulkhead 20 is a chamber 68 which serves to communicate gases from the front end of inner tube 36 to a plurality of gas inlet ports 70 and 72 formed in bulkhead 20, ports 70 leading to oxidant storage space 46 and ports 72 leading to fuel storage space 48. Element 26 of injector-wall 24 covers the rear end of tube 36 and is provided with a central gas exhaust opening 74 sealed by means of a rupturable metal gas sealing diaphragm 76. Disposed between the rear spacer-support 63 and diaphragm 76 is a helical compression spring 78 covered at the front thereof by a cap 79. The spring resiliently urges a disk-like plate or spider 80 into resilient engagement with diaphragm 76. As shown in FIG. 4, spider 80 consists of central portion 80a, connected to a rim portion 80b by radial spokes, and the construction is such that spring 78 maintains central portion 80a in gas sealing engagement over rupturable diaphragm 76. In this position spider 80 serves to prevent the application of gases produced by combustion of propellant grain 62 to the diaphragm, but otherwise permits the gases to communicate to other areas of injector-wall 24 through the openings between the spokes of the spider. Rearward movement of the spider 80 is limited by a stop means consisting of a split ring 82 expanded into a groove formed in the inner surface of inner tube 36.

The gas inlet ports 70 at the front end of oxidant storage space 46 are sealed therefrom by the previously described annular member 44. Disposed at the front end of fuel storage space 48 is deformable wall 84 consisting of a generally cylindrical shell of thin deformable metal, such as soft aluminum, which is hermetically secured, as by welding, at its front and rear marginal edge portions to bulkhead 20 and tubular partition 42, respectively. The majority of the length of deformable wall 84 forms an elongated intermediate portion 84a which covers the gas inlet ports 72 and is in mere contact with the outer surface of tubular partition 42. Formed in intermediate portion 84a are longitudinal extending folds 84b, best shown in FIG. 5, so designed and arranged that portion 84a may be distended radially outwardly to a fully deformed or inflated position, shown in broken lines, FIG. 2, against the inside surface of outer casing 18. In such inflated position, an expanded or ballonet compartment 86 is formed at the forward end of compartment 48. Near the rear end of intermediate portion 84a, in the zone of portion 84a which is inclined in the inflated position, there is provided a ring-like weakened zone 84c. It is to be noted that intermediate portion 84a does not abut against front wall 20 or partition 42 with gas sealing tightness, and that gases may therefore be readily communicated through gas inlet ports 72 into the interstices between portion 84a and tubular partition 42; but such gases are isolated from the liquid fuel by the hermetic weld joints at the front and rear marginal edges of the deformable wall 84.

Surrounding inner tube 36 is a tubular diaphragm 88 of soft or ductile sheet metal disposed in abutting relationship to and extending between a pair of closely staggered collars 90 and 92, formed on inner tube 36 and injector-wall 24, respectively. The diaphragm 88 is hermetically secured to each of the collars 90, 92 along their respective abutting surfaces. When injector-wall 24 is in its forward or initial position, the confronting sides of the staggered collars lie in the same transverse plane so that diaphragm 88 is supported against lateral loads along its entire length. Diaphragm 88 is formed with a ring-like weakened zone 88a just immediately forward of such plane.

The fuel outlet conduit 56 at the rear end of compartment 48 is sealed therefrom by a ring-like rupturable member or element 94 having a forwardly disposed massive portion 94a secured at its outer peripheral edge to casing 18 by a weld. The rear edge of member 94 is welded to injector-wall 24 and a weakened zone or portion 94b is formed intermediate the massive portion 94a and such rear edge. Member 94 also serves to retain slidable injector-wall 24 in its forward or initial position.

As previously stated, tubular partition 42 is made of resilient sheet metal, and accordingly exhibits flexibility in cross section under lateral loads. In accordance with this invention it is intended that the oxidant and fuel compartments 46, 48 be filled in the following prescribed manner: Oxidant storage compartment 46 is completely filled with liquid oxidant. This may be done as a two-step operation by first introducing the liquid oxidant into the space under pressure through an inlet and simultaneously permitting the air or other gaseous medium therein to escape through a vent opening until the space is completely filled with the oxidant; and then withdrawing a portion of the liquid oxidant without letting the gases re-enter, as by closing the vent opening and drawing the oxidant out through the inlet under a vacuum so that the greater ambient pressure in compartment 48 will exert a collapsing force against partition 42. Such withdrawal causes the cross section of the greater portion of the longitudinal expanse of tubular partition 42 to collapse under the greater pressure in compartment 48 to a non-circular, elliptical section, best shown in FIG. 6. The cross section of tubular partition 42 at its ends remains circular, of course, since the supporting structures at the ends are circular. Then, liquid fuel is introduced into fuel compartment 48, but in this instance leaving a relatively small space containing ullage gases, FIG. 6, which may compress or expand in volume under variations in volume, of the liquid fuel due to temperature changes. The fuel and ullage gases are loaded into outer space 48 at a pressure in excess of the vapor pressure of the liquid oxidant, placing the oxidant under such pressure that any vapors are substantially condensed. It will be apparent that the described method of filling the tanks maintains the oxidant under pressure and without contact with any gaseous medium and thus prevents decomposition of the oxidant and permits storage of the oxidizer in a ready to use condition within the rocket for prolonged periods. Preferably a liquid fuel is selected which has a greater vapor pressure than the vapor pressure of the oxidant, so that fuel vapors, which constitute part of the ullage gases, are in stable equilibrium with the liquid fuel during storage. It is to be further noted that any variation in volume of liquid oxidant due to temperature variations causes the cross section of tubular partition 42 to change with the consequent effect of varying the volume of compartment 48. The ullage gases in compartment 48 compensate for such changes in the same manner as the change in volume of the liquid fuel, and therefore the ullage gases in compartment 48 serve to compensate for volume changes of the liquids in both compartments.

Referring now to FIGS. 7A through 7D, the operation of the present invention will now be described, it being understood that the complete sequence depicted therein takes place in an extremely short period of time, which may be in the order of fifty milliseconds. Prior to initiation of the starting sequence, FIG. 7A, liquid oxidant is sealed in space 46 and liquid fuel and ullage gases are sealed in compartment 48. Tubular partition 42 has a length L which is many times greater than the length of stroke S of injector-wall 24 (of the order of 400 times as great in a particular construction found to provide highly satisfactory results). It will be understood that partition 42 exhibits finite axial limberness relative to the length of stroke S. Stated another way, tubular partition 42 undergoes a finite axial elongation when subjected to tension between its ends. Such limberness has been diagrammatically depicted in the aforesaid figures as a lateral deflection in the nature of arching of the wall member. The exact mechanism of the limberness is not fully understood, but it is believed to be inherent to elongated proportions of tubular partition 42 and the flexible sheet metal of which it is made.

Figure 7B:
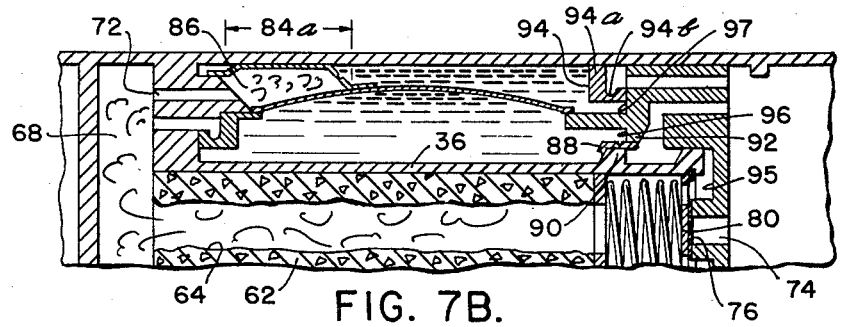

Propellant grain 62 is ignited, FIG. 7B, causing it to burn and produce gases along the surface of its bore 64. The spring urged spider 80, which is in a position covering diaphragm 76, acts as a closed valve preventing escape of the gases at the rear end of inner tube 36. Accordingly, bore 64 of the propellant grain, the front portion of tube 36 and chamber 68 constitute a closed vessel and the gas pressure rapidly rises. The pressurized gases are communicated to the inner surface of intermediate portion 84a of the deformable wall 84 through ports 72, and cause wall 84 to deform to its fully extended position thus forming chamber 86 and pressurizing the contents of fuel compartment 48. Although chamber 86 is filled with the gases, the gases remain effectively isolated from the liquid fuel in compartment 48 by deformed wall 84. Simultaneously with the rise in pressure in compartment 48, tubular partition 42 undergoes deformation in the nature of collapsing to a greater degree of ellipticalness (change is too slight to be shown), transmitting the rise in pressure to the liquid oxidant in compartment 46. Thus the fluid pressure of the gases within inner tube 36, the pressure of liquid fuel in compartment 46, and the pressure of liquid oxidant in compartment 48 rise simultaneously and proportionately and exert rearwardly directed forces against annular areas 95, 96 and 97, respectively, of the front face of injector-wall 24.

It is to be noted that rupturable element 94 alone bears the stress of such rearwardly directed force and therefore provides the only effective restraint against rearward movement of injector-wall 24. Cylindrical diaphragm 88, which is made of soft ductile metal, merely undergoes slight local yielding under the stress, the design and arrangement of the closely staggered collars 90 and 92 being such that the collars continue to provide lateral support to the diaphragm under such yielding. Tubular partition 42 is axially limber, as previously noted, and therefore does not transmit any of the load to the rupturable weakened zones 44b and 84c. Accordingly, release of injector-wall 24 is dependent upon the single rupturable element 94 which is designed and constructed to fail under predetermined tension applied axially across its weakened zone 94b. Massive portion 94a serves to support weakened zone 94b against failure under hoop stresses therein developed under the build-up of pressure in fuel compartment 48.

Figure 7C:
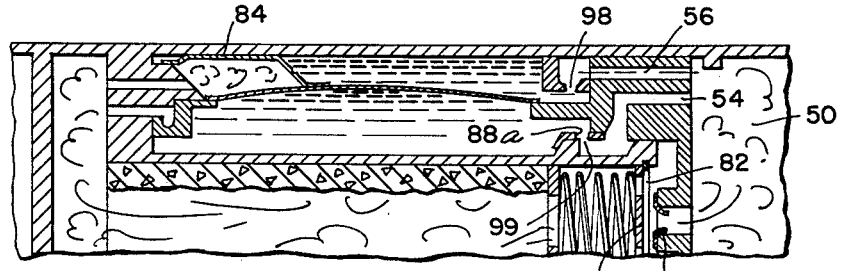

Upon the forces exerted on injector-wall 24 by the fluid pressure rising to the failing point of rupturable element 94, it ruptures, FIG. 7C, releasing injector-wall 24 to slide rearwardly under the force of the fluids. The value of tension at which rupturable element 94 is designed to fail is so chosen that the combined forces exerted by the fluids acting against areas 95, 96 and 97 will cause it to rupture when the pressure of the propellants reaches the desired feed pressure. Thus the pressure of the liquid propellants reach their desired feed pressure a moment before rupturable element 94 fails. The initial movement of injector-wall 24 moves collar 92 away from its position of support adjacent the weakened zone 88a of diaphragm 88, and the weakened portion 88a readily ruptures under the pressure of the oxidant in compartment 46; and simultaneously moves diaphragm 76 out of gas sealing engagement with spider 80, which is restrained against rearward movement by stop ring 82, permitting the pressurized gases within inner tube 36 to burst the diaphragm and open exhaust opening 74. The construction and arrangement is such that the diaphragm 88 and diaphragm 76 are ruptured upon only very slight movement of injector-wall 24, which occurs practically instantaneously after rupturing of rupture element 94. The rupturing of elements 94 and diaphragm 88 and the movement of injector-wall 24 form annular ports 98 and 99 through which the liquid propellants may flow into their respective outlet conduits and thence into combustion chamber 50 where they intermix and react, producing propulsion gases. The hot gases introduced into combustion chamber 50 through exhaust opening 74 assist in the igniting of the propellants and improve the combustion characteristics by causing turbulence. It is to be noted that since the movement of injector-wall 24 is powered by the combined forces exerted by pressure acting on areas 95, 96 and 97, its movement is more rapid than it would be if powered by pressure within one chamber alone. Also, the geometry of the annular ports 93 and 99 is such that upon slight movement of the injector-wall they provide a large passageway area relative to the combined areas of the respective passage elements 54c and 56c, which as hereinbefore noted constitute the injector nozzles. These factors assist in minimizing the delay in initiating injection of the propellants into the combustion chamber, and in minimizing any undesired transistory phenomenon between the instant element 94 ruptures and the instant the propellants are inected at full feed pressure.

It will be understood that the volume of expansible compartment 86, the feed pressure to which the liquid fuel is built up, and the solubility and vapor pressure characteristics of the gaseous medium in the ullage space are predetermined to be of the proper relation to cause all the gaseous medium to be condensed or forced into solution before rupturable element 94 fails. Also, the violent rearward surge of the liquid fuel caused by inflation of compartment 86 assists the condensing and forcing into solution of the ullage medium by augmenting heat transfer, therefore permitting rapid dissipation of the heat of compression produced when the ullage gas is compressed. Accordingly, feed of the liquid fuel into the combustion chamber in a liquid phase is assured, obviating flashbacks and other erratic performance which could arise through presence of gases during initial injection. Feeding of the oxidant into the combustion chamber in liquid phase is also insured since compartment 46 is maintained completely filled with oxidant under a pressure in excess of its vapor pressure, as hereinbefore described.

The propellant grain 62 is chosen to produce the pressurizing gases at a sufficient rate to effect compression of the ullage gas medium in a predetermined period of time, which is a small fraction of the overall delay interval between electrical initiation of the igniter and flow of propellant into combustion chamber, so that any variation in the time to compress the ullage medium due to temperature variation would be negligible relative to such overall delay interval. Such rate of producing gases would ordinarily cause the pressure to build up rapidly to destructive levels. To avoid this, the gas exhaust opening 74 must provide sufficient area to vent the portion of gases which are in excess of the needs of maintaining the feed pressure after element 94 ruptures. The near instantaneous rupturing of diaphragm 76 upon movement of injector-wall 24 is important in this connection, as it enables the feed pressure to remain substantially constant once element 94 is ruptured.

The geometry of annular ports 98 is further important, in that it provides sufficient outlet passageway area for full flow upon injector-wall 24 moving only a small fraction of its total stroke S. In accordance with the invention, the amount of propellant flowed into the combustion chamber, before the injector-wall reaches the portion of its stroke at which the limberness of tubular partition 42 is taken up, provides sufficient forward acceleration to force liquid propellants to the rear ends of their respective compartments. Thus, the limber tubular partition 42 serves as a lost motion linkage or delay means in transmitting the force of the injector wall to the rupturable elements at the front end of the storage compartment. Accordingly, rupture element 44 and deformable wall 84 remain intact and isolate the pressurizing gases and the liquid propellants during the period of acceleration build up, thereby eliminating destructive explosions and erratic behavior which could occur should negative acceleration slosh the propellant forwardly through the gas inlet ports, or should negative acceleration cause the pressurizing gases to "bubble" rearwardly into the injection ports.

Figure 7D:
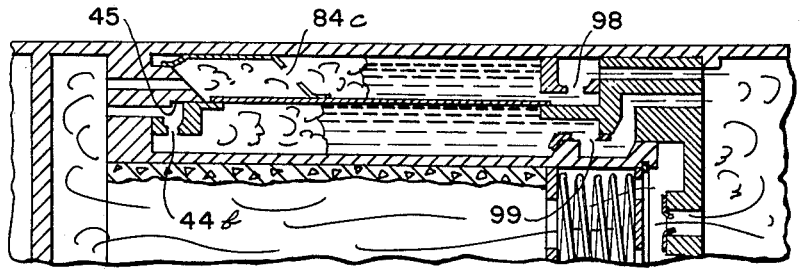

Upon the injector-wall 24 moving to the position in its stroke where the axial limberness of tubular partition 42 is fully taken up, the continued movement of the injector-wall ruptures rupturable element 44 and deformable wall 84, FIG. 7D, at their respective weakened zones 44b and 84c, and tubular partition 42 moves rearwardly with injector-wall 24. The sliding joint formed between axially extending surface 45 and rupturable member 44 maintains the fluid tight integrity of compartments 46 and 48 as partition 42 thusly moves rearwardly. Upon rupturing of element 44 and wall 84 the pressurizing gases are admitted directly into the interior of propellant compartments 46 and 48, where the gases exerting force upon the liquid propellants maintain the propellants under constant feed pressure until the compartments are emptied. Since the liquids remain at the rear ends of the compartments under the continued acceleration, the pressurizing gases remain disposed at the forward ends of the compartments.

As was hereinbefore noted, the scheme of initial rupturing is that a single rupturable element 94 is ruptured by the combined forces of liquid propellant acting against injector-wall areas 96 and 97 and gas pressure acting against area 95. In accordance with this invention the ratio of areas 96 and 97 to area 95 is so chosen that there is a maximum predetermined inertial force which will not cause rupturing of element 94 in absence of gas pressure acting against area 95. Thus before propellant grain 62 is ignited, the rupturing scheme can tolerate loads due to inertial force of the liquid in compartments 46 and 48 in excess of the normal feed pressure. On the other hand, upon ignition of the propellant grain the combined forces of pressurized liquid and pressurized gases will act against injector-wall 24 so that element 94 will rupture when the liquid pressure is at the desired feed pressure, which may be lower than the aforementioned maximum inertial force.

If desired, a bag 100 containing a suitable material having high latent heat, such as oxalic acid powder or water, may be disposed in chamber 68 to suppress the initial heat produced during ignition of propellant grain 62, which heat may otherwise damage thin wall 84.

Obviously many modifications and variations of the present invention are possible in the light of the above teachings. It is therefore to be understood that within the scope of the appended claims the invention may be practiced otherwise than as specifically described.

What is claimed is:

1. In combination with a rocket motor of the liquid bi-propellant type and having a rigid body, a first elongated tube in stationary relationship to said body providing a first chamber therewithin, a second elongated tube concentrically surrounding the first tube and forming a second annular chamber therebetween to contain one of the rocket motor liquid propellants, a third elongated tube in stationary relationship to said body and concentrically surrounding the second tube and forming a third annular chamber therebetween to contain the other of the rocket motor liquid propellants, a rocket motor combustion chamber disposed rearwardly of the rear end of said tubes, an axially movable member disposed between said tubes and said combustion chamber adapted to move rearwardly away from an initial position, said second tube being adapted for axial movement and affixed at its rear end to said movable member for movement therewith, said movable member being provided with a first and second series of ports for injecting liquid propellant into said combustion chamber, a fourth chamber adjacent the front end of said tubes and communicating with the front end of said first tube, first rupturable wall means closing the front ends of said second and third chambers and operatively connected to a front end portion of said second tube, said first rupturable wall means upon rupturing being adapted to establish communication between said fourth chamber and said second and third chambers at the forward ends thereof, second rupturable wall means closing the rear ends of said second and third chambers and operatively connected to said movable member, said second rupturable wall means upon rupturing being adapted to establish communication between said second and third chambers and said first and second series of ports provided in the movable member, respectively, said first chamber containing a solid propellant adapted to burn to produce pressurized gases, said first rupturable wall means and said second and third chambers providing deformable wall means to transmit the pressure of gases in said fourth chamber to the liquid propellants in said second and third chambers before rupture of said first wall means, said movable member being adapted to move rearwardly under combined liquid propellant pressures and first chamber gas pressure in response to ignition of said solid propellant, said movable member, upon a predetermined rise in propellant pressure, being operative to rupture said first and second rupturable wall means and move away from said initial position, whereby said gases apply pressure to said second and third chambers to feed the propellants therein into said first and second series of ports and thence into said combustion chamber, said second rupturable wall means being operatively connected to said stationary tubes and to said movable member and so constructed to restrain said movable member against movement from said initial position until said propellant pressure reaches a predetermined feed pressure whereby liquid feed into said combustion chamber is initiated at said feed pressure.

2. Apparatus in accordance with claim 1, said second rupturable wall means comprising a first rupturable wall portion closing one of said annular chambers and being adapted to rupture in response to axial tension, and a second rupturable wall portion closing the other of said annular chambers being adapted to rupture in response to initial rearward movement of said movable member upon rupture of said first wall portion, whereby said first rupturable wall portion, alone, is effective to restrain said movable member, and the second rupturable wall portion ruptures in substantially immediate sequence after rupturing of said first rupturable wall portion.

3. Apparatus in accordance with claim 1 including, valve means closing said first chamber at its rear end when said movable member is in its initial position and being adapted to open upon movement thereof away from its initial position to vent excess gases after the propellant pressure reaches said feed pressure.

4. Apparatus in accordance with claim 1 wherein said movable member is provided with first surfaces subjected to said combined liquid propellant pressures and a second surface subjected to said first chamber pressure, the areas of said surfaces being so proportioned that the pressures exerted thereon by a predetermined inertia force produced by the liquid propellant is insufficient to rupture said second rupturable wall means, whereby said second wall means may rupture only upon ignition of said solid propellant.

5. Apparatus in accordance with claim 1, said second tube being yieldable in axial tension to provide a predetermined lost motion between rearward movement of the movable member and rearward movement of the front end of the second tube to thereby delay rupturing of said first rupturable wall means by a predetermined lapse of time from the start of injection of the propellants into the combustion chamber, said predetermined lapse of time being sufficient to permit normal propulsion effects of the combustion of the propellants in the combustion chamber to produce sufficient forward acceleration to maintain the propellants at the rear end of the second and third chambers when the first rupturable wall means is ruptured and said gases are introduced into said second and third chambers.

6. Apparatus in accordance with claim 2, said second rupturable wall portions each having an annular intermediate ring-like weakened portion, the movement of said movable member away from the initial position causing rupture of the intermediate portion, and continued movement of said movable member forming an annular port of definite extent between said first and second wall portions.

7. Apparatus in accordance with claim 1 wherein the first rupturable wall means comprises a longitudinally extending shell of thin deformable metal associated with one of said annular chambers to close same and disposed in normally abutting relation to a longitudinal wall of the associated annular chamber, said shell being adapted to deform radially away from the abutting longitudinal wall to form an expansible annular compartment at the front end of the associated chamber, said first rupturable wall means being adapted to communicate gases from said fourth chamber to said expansible compartment to deform said shell to pressurize the associated chamber.

References Cited in the file of this patent

UNITED STATES PATENTS

| | | |
|---|---|---|
| 2,954,670 | Helus et al. | Oct. 4, 1960 |
| 2,955,649 | Hoffman et al. | Oct. 11, 1960 |
| 2,971,426 | Potts | Feb. 14, 1961 |
| 3,009,385 | Burnside | Nov. 21, 1961 |
| 3,013,389 | Barnes | Dec. 19, 1961 |